Jan. 31, 1933.   J. W. BRUNDAGE   1,895,603
MOLDING PRESS
Filed Nov. 24, 1930

Inventor
J. W. Brundage,
By Robert M. Pierson,
Attorney

Patented Jan. 31, 1933

1,895,603

UNITED STATES PATENT OFFICE

JAMES WILLIAM BRUNDAGE, OF AKRON, OHIO, ASSIGNOR TO THE SUMMIT MOLD & MACHINE COMPANY, OF AKRON, OHIO, A CORPORATION OF OHIO

MOLDING PRESS

Application filed November 24, 1930. Serial No. 497,637.

This invention relates to presses for molding plastic materials, and particularly to individual vulcanizers for pneumatic tire tubes and casings.

As commonly constructed, tire vulcanizers of the so-called watch-case type, comprising mating mold sections hinged together, are subject to certain disadvantages including the difficulty of making a proper joint by bringing the mold sections together in an arcuate path, and the danger of catching and injuring the operator's hands as the sections are closed together. On the other hand, ram vulcanizers which open and close by a rectilinear movement only are not so convenient for loading and unloading.

My present invention combines the advantages and avoids the drawbacks of the two mentioned types of presses. It has for its object to provide increased safety of operation, greater facility of loading and unloading, and a firm and tight closure of the mold, together with a simple and positive structure and mode of operation. A further object is to cause the press to perform, in a simplified manner, an automatic series of operations which include the opening of the mold and presentation of one of its sections in position for unloading and reloading, followed by stripping or ejection of the tire.

Figure 1:
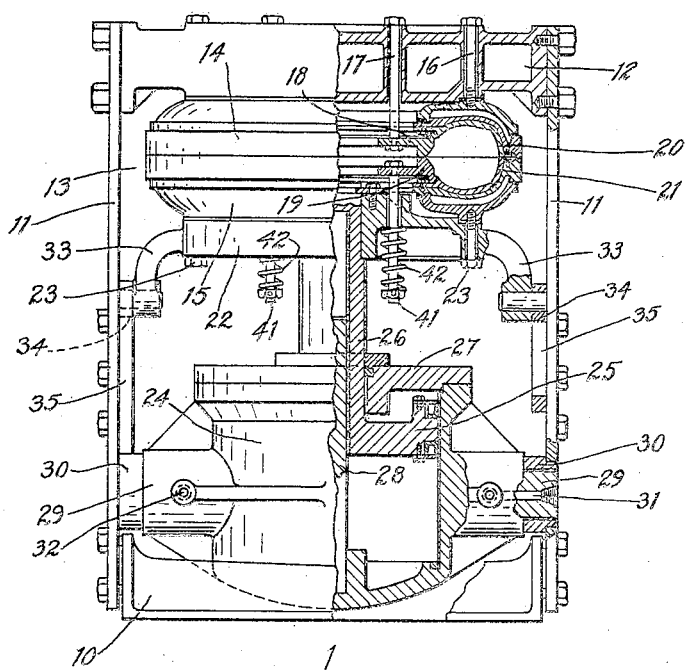
Figure 2:
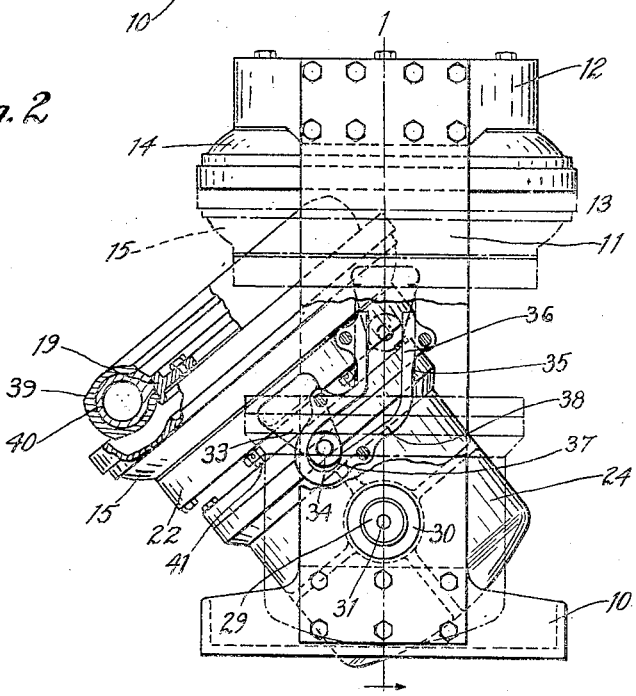

Of the accompanying drawing, Fig. 1 is a front elevation, partly in section on the line 1—1 of Fig. 2, showing a preferred embodiment of my invention, with an empty tire mold.

Fig. 2 is a side elevation, partly broken away and in section, showing the lower mold section and cylinder tilted forwardly into the unloading and loading position, and illustrating the tire stripped from the mold.

Referring to the drawing, 10 is a horizontal frame-base casting, 11, 11 are stationary vertical side-plate standards affixed thereto and 12 is a horizontal head-plate casting or platen fixed between the upper ends of said standards. 13 is an individual tire mode including upper and lower steam-jacketed mold sections 14, 15, of which the upper section is secured to the press head 12 by means of bolts 16, 17, while the lower section is movably mounted as hereinafter described. The bolts 17 are attached to the inner flange of an upper ring or rim member 18 which supports the tire bead and the inflatable core or fluid-pressure bag for expanding the tire casing.

A corresponding bead ring or rim member 19 on the lower side acts as a work stripper or ejector. The mold 13 is here shown with mold members or liners 20, 21 removably mounted in the steam jackets of the sections 14, 15.

For supporting and operating the lower mold section 15, I provide a movable head or mold platen 22 to which said section is secured by bolts 23, and a double-acting hydraulic ram cylinder 24 and piston or plunger 25 therein, provided with a stem or rod 26 extending through a stuffing-box in the upper cylinder head 27 and carrying said head 22 affixed at its upper end in a plane at right angles to the axis of the plunger. The rod 26 is shown as hollow or tubular and telescopically fitting a central guide rod 28 fixed to the lower cylinder head to assist in holding the reciprocating parts in a straight path and securing a proper closing registration of the mold sections.

The cylinder 24, constituting a carrier on which the head 22 is slidably mounted, is formed with trunnions 29 pivoted on a horizontal axis in bearings 30 on the frame standards 11 in order that it may be tilted from and to a vertical position during the lower portion of the movement of its piston. These trunnions and bearings sustain the press pressure when the mold sections are brought together. Hydraulic pressure may be led to and from the lower and upper ends of the cylinder in any suitable manner, as by means of passages 31, 32, partially illustrated in the drawing and formed partly in the trunnions 29, the supply and exhaust being controlled by suitable valve mechanism not herein illustrated.

For guiding the movements of the lower mold support or head 22, I provide the latter at opposite points with downwardly-extending arms 33 carrying horizontal pins provided with rollers 34 which occupy grooves or channels in a pair of duplicate cam plates 35 bolted to the inner faces of the frame standards 11. As indicated in Fig. 2 for one of these cam plates, its groove is formed with a vertical upper-end portion 36, a shorter vertical lower-end portion 37, and an inclined or diagonal portion 38 connecting said end portions. Said inclined portions of the cam grooves, when traversed by the rollers 34 due to the reciprocating movement of the piston in its cylinder, cause the cylinder to tilt from or toward the vertical.

For controlling the stripper ring 19 so that the tire casing 39 and its contained air bag 40 will be ejected at the conclusion of the retracting movement of the piston 25, I provide said ring with a series of four operating rods or posts 41 spaced equidistantly around its inner flange and extending through apertures in the head 22 and normally retracted by means of springs 42, said rods being adapted to be arrested by encountering the cylinder head 27 as the piston approaches the lower end of its stroke and thus to hold the ring 29 stationary while the mold section 15 continues to retreat and thereby strip itself from the tire.

In operating this press, the raw tire casing with its contained air bag or water bag is placed upon the stripper ring 19 when the parts are positioned as in Fig. 2. Hydraulic pressure being admitted to the lower end of cylinder 24 and its upper end exhausted, the piston 25 and attaching parts are raised. The rollers 34 passing along the inclined portions 38 of the cam plates will cause the cylinder assembly to move toward and finally assume a vertical position as the piston and lower mold section move upwardly and the rollers enter the upper-end vertical portions 36 of the cam grooves. The last portion of the up-stroke is a vertical rectilinear movement in which the lower mold section 15 is brought into registered relation with the upper section 14 and the two are closed tightly together, whereupon fluid pressure is admitted to the air bag 40 and vulcanization of the tire proceeds. When the tire has been cured, the lower end of cylinder 24 is exhausted and the weight of the piston and attached parts, aided by fluid pressure admitted to the upper end of the cylinder, causes the piston to descend and open the mold. In most cases the tire will remain in the lower mold section 15. As said mold section and the piston continue to descend, the rollers 34 pass into the inclined portions of the cam-plate grooves and cause the cylinder assembly to tilt forward toward the loading and unloading position indicated in Fig. 2. In this fully-open condition, the lower mold section 15 has been advanced relatively to the upper section to position its plane at an acute angle to that of said upper section and to project its molding portion to a substantial extent forward of the frame sides 11, so that said molding portion will be accessible from both front and sides.

During the last portion of the down-stroke, the stripper ring 19 is arrested by its rods 41 encountering the cylinder head 27, and the lower mold section 15 is stripped away from the tire casing 39, leaving the latter with its contained air-bag supported on said ring 19 in a convenient position for removal by the operator.

Thus it will be seen that mold closure is accomplished by a rectilinear movement of one of the mold sections in a position remote from the operator, to which it has been carried by a swinging movement, so that there is little or no opportunity for injuring his fingers by having them caught between the sections. When the press is opened, the movable mold section is presented in a forwardly-inclined position, with the work loosened or stripped therefrom, which greatly facilitates the unloading and recharging operations. Since the automatic movements of the press are accomplished by a single motor means such as the described fluid-pressure ram, in cooperation with cam or equivalent devices, the apparatus is of a relatively simple and durable character and may be produced and sold at a moderate cost.

It will be understood that inner tubes and other moldable articles as well as tire casings may be treated in a press of this type, the form of the mold being varied to suit the article.

Since my invention may be embodied in modified forms having substantially the same principle or mode of operation, it is not intended to limit the scope thereof as defined in the claims, except as required by the prior art. For example, while it is preferred to have the lower mold section inclined forwardly from the vertical in its loading and unloading position, this is not broadly essential and other arrangements are possible. Also, while the relative lateral movement of the press platens to bring them into and out of line is preferably effected by pivoting the ram cylinder as here illustrated, substantially the same effect may be produced with modified arrangements, and it is further possible to accomplish this relative movement with any suitable equivalent for the illustrated cams, although perhaps not as simply or effectively.

I claim:

1. A molding press comprising a pair of press heads adapted to carry mating mold sections and having a relative rectilinear opening and closing movement, fixed and swinging structures supporting the respective heads and connected by pivoting means which sustains the molding pressure, a power ram included with one of said structures and having a member connected with the corresponding head for imparting said relative rectilinear movement, and position-controlling means connecting the heads for maintaining them substantially parallel during one part of said relative rectilinear movement and for relatively swinging them progressively into and out of line by means of said movement during another part thereof, from and to the loading and unloading position.

2. In a molding press, the combination of a pair of mold sections, a frame fixedly carrying one of said sections, a head carrier connected with said frame by pivots which sustain the molding pressure, for relatively moving the sections angularly into and out of line, a head slidable on said carrier and fixedly carrying the other section, and a connection between said head and frame including a pin on one of them and a cam slot on the other occupied by said pin and having a rectilinear portion for guiding the head to move its mold section in parallelism with the other section and an inclined portion for producing relative angular displacement of the head and frame by retraction of said head.

3. A molding press comprising a frame and a fluid-pressure ram mounted for relative angular movement, said ram having a plunger, a pair of press heads fixedly carried respectively by said frame and said ram plunger, and a connection between the frame and plunger, including cam means on one of them, for relatively guiding the press heads in parallelism during their opening and closing movement and for producing the relative angular movement of the frame and ram by longitudinal movement of the ram plunger.

4. A molding press comprising a frame base, an upper head constituting the uppermost press member and having a mold section, a pair of side frames connecting said head with the base, a lower head having a mold section, a ram cylinder pivotally connected with said side frames and having a plunger carrying the lower head, and cam means on said side frames controlling the lateral relation of the heads for relatively guiding the latter during longitudinal movement of the lower head in an opening and closing movement in parallelism and in a relative swinging movement to and from a fully open loading and unloading position in which the plane of the lower mold section is forwardly inclined at an acute angle relatively to that of the upper mold section and the molding portion of the lower section is substantially exposed forwardly of said side frames.

5. A molding press comprising a pair of press heads carrying respective mold sections and mounted for relative rectilinear opening and closing movement and also for relative lateral movement into and out of line, a fluid-pressure ram including a plunger having one of said heads fixed thereto at right angles to its longitudinal line of movement, a frame carrying the other press head and connected with the ram by pivots which sustain the molding pressure, and means acting by longitudinal movement of said plunger for effecting the relative lateral movement of the heads.

6. A molding press according to claim 5 including upper and lower heads of which the lower one is carried by the stem of the ram plunger and occupies a loading and unloading position forwardly inclined relative to the upper head when the press is fully open.

7. A molding press according to claim 5 including cam devices subject to the action of the plunger for maintaining the rectilinear relation of the heads and effecting their relative lateral displacement in different parts of the plunger stroke.

8. A molding press comprising a fixed upper mold section, a mating, movable, lower mold section, guiding means for causing a substantially rectilinear opening and closing action of said lower section in the upper part and a tilting action thereof in the lower part of its movement, and a pivoted fluid-pressure ram partaking of said rectilinear and tilting actions and adapted to produce both of said actions.

9. A molding press comprising a stationary platen, a ram having a pivoted cylinder and plunger, a second platen carried by the plunger and guided for rectilinear opening and closing movement with respect to the stationary platen during one part of the plunger movement, and means actuated by the plunger during another part of its movement for swinging the ram cylinder to carry the movable platen into and out of line with the stationary platen.

10. A molding press comprising a frame having fixed cams and a fixed overhead mold section, a mating lower mold section, a supporting head for the latter having members engaging said cams and guided thereby for rectilinear mold-opening action in the first part of its descending movement and for tilting action thereafter to present said lower mold section in a forwardly inclined unloading and reloading position relative to the overhead mold section, and a pivoted cylinder having a piston carrying said supporting head.

11. A molding press comprising a stationary frame provided with an upper platen and also with cam slots having rectilinear and inclined portions, a ram having a pivoted cylinder and plunger, and a movable lower platen carried by said plunger and having guide pins occupying the cam slots.

12. A molding press comprising upper and lower mold sections guided for relative rectilinear opening and closing movement and also for relative lateral movement into and out of line, a ram having a plunger which carries the lower mold section, means actuated by said plunger for relatively moving the mold sections out of line, a work ejector associated with said lower mold section, and means for arresting said ejector while the lower mold section continues its retracting movement following a relative lateral movement of the mold sections.

13. A molding press comprising a pivoted cylinder and piston, a movable mold section carried by said piston and guided therewith for rectilinear mold-opening movement followed by lateral pivoting movement, a work-ejector associated with said mold section, and means for arresting said work-ejector and causing said mold section to be stripped from the work during the conclusion of the retracting stroke of the piston.

In witness whereof I have hereunto set my hand this 21st day of Nov., 1930.

JAMES WILLIAM BRUNDAGE.